March 18, 1930.　　　F. H. JOHNSON　　　1,750,757
ELECTRIC WELDING MACHINE
Filed May 19, 1927
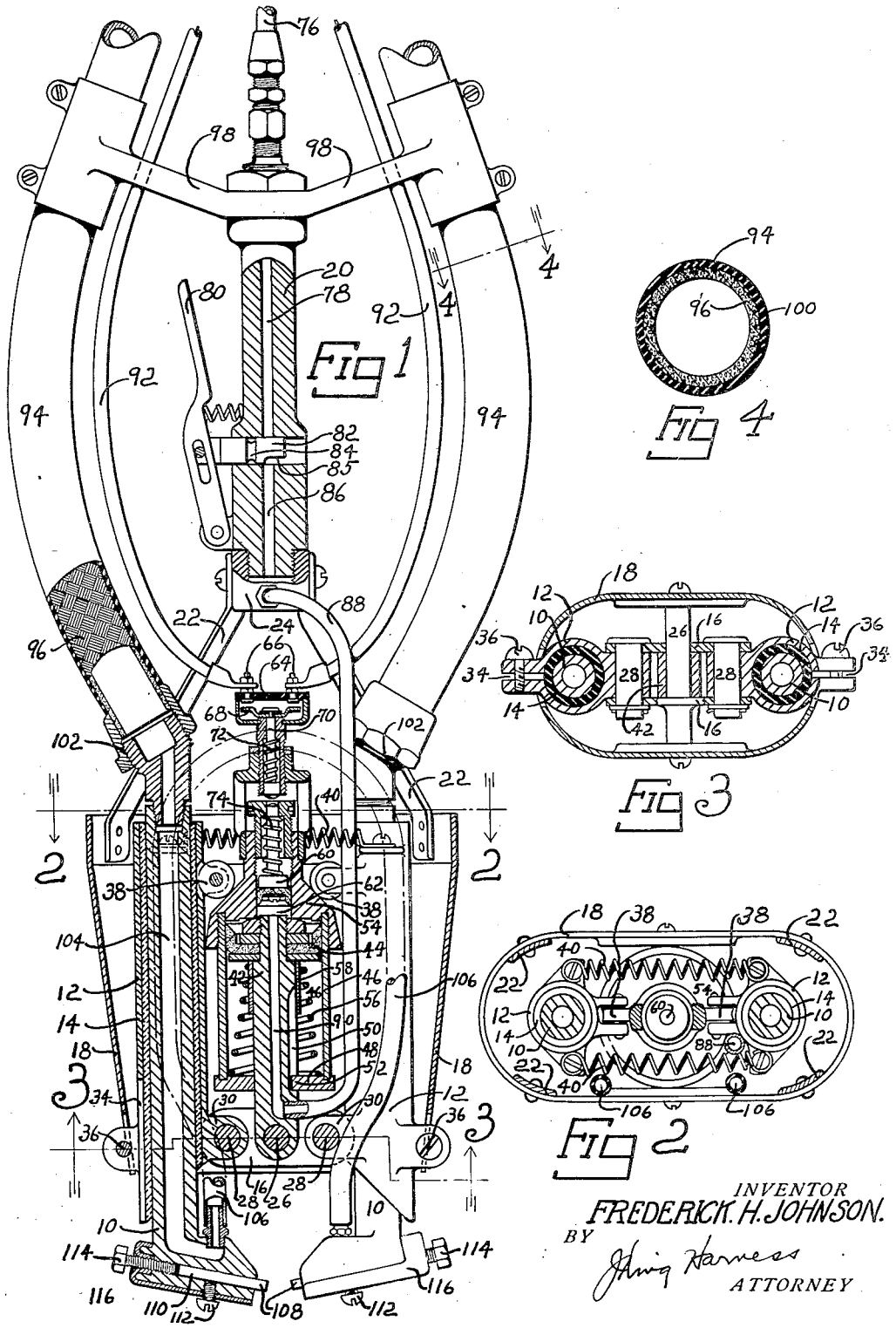
INVENTOR
FREDERICK H. JOHNSON.
BY
　　　ATTORNEY Patented Mar. 18, 1930

1,750,757

UNITED STATES PATENT OFFICE

FREDERICK H. JOHNSON, OF DETROIT, MICHIGAN

ELECTRIC WELDING MACHINE

Application filed May 19, 1927. Serial No. 192,714.

This invention relates to a welding machine and more particularly to a portable electric welding machine in which the assembled parts form a light weight construction.

It is desirable, especially in automobile body welding, to apply a certain pressure with the welding terminals to the stamped parts during welding and to complete the electrical circuit during the time that the pressure is applied.

An important object of this invention is to control the pressure applied to the work and to automatically complete the electrical circuit at a predetermined pressure, breaking the circuit before the pressure is relieved.

Another object of the invention is to provide means for controlling a reciprocating wedge, adapted to pivot a pair of oppositely arranged welding terminals.

A further object of the invention is to provide a cooling means for the terminals and electric conductors illustrated by circulating a cooling medium, such as water, thru the center of one cable and terminal to the other terminal and conductor.

These and other objects of my invention will more fully appear from the following description taken in connection with the accompanying drawings, in which:

Fig. 1 is a longitudinal view of the device, parts being broken away.

Fig. 2 is a sectional view on line 2—2 of Fig. 1.

Fig. 3 is a sectional view on line 3—3 of Fig. 1.

Fig. 4 is a sectional view thru the electrical conductor.

Referring to the drawings, a pair of terminals 10 are carried by pivoted supports 12 and insulated therefrom as at 14. The supports 12 are pivoted between links 16 carried by a frame work or housing 18 secured to a handle 20. The housing comprises a shell portion having at its upper edge arms 22 which are secured to a threaded member 24 received on the end of the handle 20. The lower end of the shell is provided with a central cross shaft 26 on which is pivoted links 16. Pins 28 pivotally secure bosses 30 on the supports 12, between the links 16. The supports 12 are shown tubular and a slot 34 permits a portion of the tube to be tightly drawn around the terminal and its insulation by means of a screw 36 engaging flanges on opposite sides of the slot.

The upper end of the supports 12 are provided with rollers 38 which engage a reciprocating wedge or tapered surface adapted to urge the upper ends of the supports outwardly against the tension of springs 40 secured between the supports.

Pivotally secured on the cross shaft 26 is a vertically extending rod 42 to which is secured a conventional piston 44, preferably a leather washer secured thereon between metallic washers by a nut screw-threaded on the upper end of the rod 42. Fitted around the rod 42 and piston 44 is a movable cylinder 46 having its lower end closed by an end wall 48. An elongated slot 50 in the rod 42 receives a tongue 52 to prevent rotation of the cylinder 46. The upper end of the cylinder is provided with a head portion 54, the upper surface of which is formed with the tapered surface above referred to. The cylinder 46 is resiliently held in its downward position by a spring 56 between the piston 44 and end wall 48. A sleeve 58 may be provided around the rod 42 to limit the upward movement of the cylinder.

Another smaller piston 60 is adapted to reciprocate in a cylinder 62 formed in the cylinder head 54 and a switch 64 is carried by the cylinder head adapted to be controlled by the piston 60. The switch 64 consists of a pair of terminals 66 and a contact member 68 carried by a plunger 70. A spring 72 normally holds the contact member 68 away from engagement with the terminals 66 but the upward movement of the piston 60, against the resistance of a spring 74, forces the plunger 70 and contact member against the terminals 66 to thereby complete a relay circuit hereinafter more fully described.

The handle 20 is provided with a valve adapted to open or close a pressure passage leading from a convenient pressure supply, preferably compressed air, to the cylinder chamber. A conduit 76 is secured to the handle 20 communicating with a passage 78 in the handle. The valve consists of a handle 80 adapted to reciprocate a plunger 82 provided with an annular groove so that when in the position shown the passage 78 is closed but when the handle 80 is depressed the annular groove 84 establishes communication between the passage 78 and an aligned passage 86. Connecting with the passage 86 is a conduit 88 leading to the lower end of the rod 42 and a passage 90 directs the pressure between the piston 44 and cylinder head 54. The pressure, when conducted to this chamber, causes the cylinder to rise and the tapered surface causes the supports 12 and terminals 10 to pivot outwardly at their lower ends to apply a pressure on the work. When the pressure is cut off, the valve being in a position shown on the drawings, the spring 56 causes the cylinder to be returned, exhausting the pressure back thru the passage 90, conduit 88 and slotted opening 85 in the valve 82. The tapered surface is shown having two tapers, one a quick taper which brings the terminals together quickly and the other a gradual taper which permits a greater travel of the head to apply the predetermined pressure on the work. When the desired pressure on the work has been reached the pressure in the larger chamber builds up sufficiently to move the piston causing it to raise the contact member 68 thereby completing the electrical relay circuit thru conductor 92. It will be understood that the pressure on the work may be carried by changing the design of the tapered surface and the relay circuit may be completed at any desired pressure by varying the diameter of the cylinder 62 or tension of the spring 74 so that by applying a pressure between the pistons 44 and 60 the circuit is automatically completed at the time of a predetermined pressure on the work.

The relay mechanism for completing the welding circuit is not shown but when the relay circuit is completed a circuit thru cables 94 and terminals 10 is completed. The cables 94 are formed from flexible tubing made up of interwoven strands of copper wire 96 known commercially as "flextite" tubing. The tubing itself is water tight and forms a conductor for a cooling medium thru its center and at the same time a conductor for an electrical current. Brackets 98, secured to the handle 20, support the cables and an insulation material 100 such as rubber, tape, or asbestos around the outer surface of the cable prevents them from being short circuited.

The end of the cable is secured to the upper end of the terminal 10 as at 102. The terminals are provided with a passage 104 which communicates with the hollow cable and a conduit 106 connects one passage 104 of one terminal with the other passage of the other terminal in such a manner that a cooling medium, such as water, may be forced in one cable thru its terminal to the welding point thereof, then conducted to the other welding point, and thru the other terminal and cable. The welding points or tips 108, shown as a cylindrical rod, are removably held in an opening 110 by a screw 112. They may be advanced by an adjusting screw 114. A steel lining 116 has been provided to receive the screws 112 and 114 to prevent stripping of screw threads in the soft copper terminal.

While the invention has been described specifically to the form shown in the drawings it is to be understood that various changes in the shape, construction and arrangement of parts may be made without departing from the spirit of my invention and it is not my intention to limit its scope other than by the terms of the appended claims.

What I claim is:

1. In an electric welding machine, the combination of a pair of pivotally supported electric terminals, an electric welding circuit for said terminals, means for producing a predetermined pressure between the working ends of said terminals, means dependent on said pressure for automatically completing said welding circuit, and means for increasing the pressure between the working ends of said terminals after the welding circuit has been completed.

2. In an electric welding machine, the combination of a pair of pivotally supported electric terminals, a welding circuit for said terminals, a relay circuit for completing said welding circuit, a reciprocating cylinder between the upper ends of said terminals adapted to produce a predetermined pressure between the working ends of said terminals, a pair of pistons in said cylinder, and pressure means between said pistons for moving said cylinder and completing said relay circuit.

3. In an electric welding machine, the combination of a frame, a handle for supporting said frame, a pair of electric terminals supported on said frame, a welding circuit for said terminals, pressure controlled means for effecting a pressure between the working ends of said terminals, means carried by said handle for controlling said pressure, and means dependent upon said pressure for completing the welding circuit.

4. In an electric welding machine, the combination of a pair of terminals, flexible electric cables secured to said terminals, means for producing a predetermined pressure between the working ends of said terminals, means for completing an electric circuit thru said cables and terminals, and means for conducting a cooling medium thru the center of said cables and said terminals.

5. In an electric welding machine, the combination of a pair of hollow electric terminals, hollow flexible cables secured to said terminals, said cables being formed from interwoven copper strands, and a conduit connecting the working ends of said terminals communicating with the hollow passages thru said cables and said terminals for circulating a cooling liquid therethru.

6. In an electric welding machine, the combination of a hollow electric terminal, a hollow flexible cable secured to said terminal, said cable being formed solely from interwoven copper strands, and means for circulating a cooling medium thru said hollow cable and terminal.

7. In an electric welding machine, the combination of a pair of pivotally supported electric terminals, a reciprocating member between said terminals adapted to produce a predetermined pressure between the working ends of said terminals by its reciprocating movement, pressure controlled means for reciprocating said member, and an electrical circuit completing device mounted on said reciprocating member and movable relative thereto by the pressure controlling said reciprocating member.

8. In an electric welding machine, the combination of a pair of pivotally supported electric terminals, a cylinder and piston between the upper ends of said terminals one of which being movable with respect to said terminals and provided with a tapered surface to pivot said terminals in opposite directions, means for supplying an air pressure between said cylinder and piston, and means for completing an electrical circuit to said terminals.

9. In an electric welding machine, the combination of a pair of pivotally supported electric terminals, a movable cylinder between the ends of said terminals opposite their working ends provided with a tapered surface for engagement with said terminals, a stationary piston in said cylinder, means for supplying an air pressure between said cylinder and said piston, a member carried by said cylinder movable relative thereto and by the air pressure between said cylinder and said piston for completing an electrical circuit to said terminals.

10. In an electric welding machine, the combination of a hollow electric terminal, a hollow flexible cable secured to said terminal, said cable being formed solely from interwoven copper strands, means for circulating a cooling medium through said hollow cable and terminal, and an electrical insulating member around said cable.

FREDERICK H. JOHNSON.